United States Patent [19]
Wuest et al.

[11] Patent Number: 5,112,675
[45] Date of Patent: May 12, 1992

[54] MONOLITHIC SOLAR PROTECTION GLAZING AND PROCESS OF ITS MANUFACTURE

[75] Inventors: Isabelle Wuest, Paris; Charles E. Anderson, Courbevoie; Jacques Tabare, Presles, all of France

[73] Assignee: Saint-Gobain Vitrage International, Courbevoie, France

[21] Appl. No.: 443,178

[22] Filed: Nov. 30, 1989

[30] Foreign Application Priority Data

Dec. 8, 1988 [FR] France .................. 88 16112

[51] Int. Cl.$^5$ .................................. B32B 17/06
[52] U.S. Cl. .................................. 428/216; 428/212; 428/408; 428/426; 428/432; 428/697; 428/698; 428/699; 428/701
[58] Field of Search ............... 428/698, 408, 426, 432, 428/697, 699, 216, 701, 212, 336; 350/1.6, 164, 166

[56] References Cited

U.S. PATENT DOCUMENTS

| | | | |
|---|---|---|---|
| 3,885,855 | 5/1975 | Gross | 350/166 |
| 4,341,841 | 7/1982 | Ohno et al. | 428/426 |
| 4,568,578 | 2/1986 | Arfsten et al. | 428/432 |
| 4,690,871 | 1/1987 | Gordon | 428/432 |
| 4,732,454 | 3/1988 | Saito et al. | 350/164 |

Primary Examiner—Ellis P. Robinson
Assistant Examiner—Archene Turner
Attorney, Agent, or Firm—Oblon, Spivak, McClelland, Maier & Neustadt

[57] ABSTRACT

Glazing absorbing heat and intended for automobiles consists of a clear or tinted glass covered with a layer of TiC and an overlayer of ITO deposited by cathode sputtering. It is particularly suited to systems of glazings whose transmission decreases by degrees from the front to the rear of the vehicle.

7 Claims, 2 Drawing Sheets

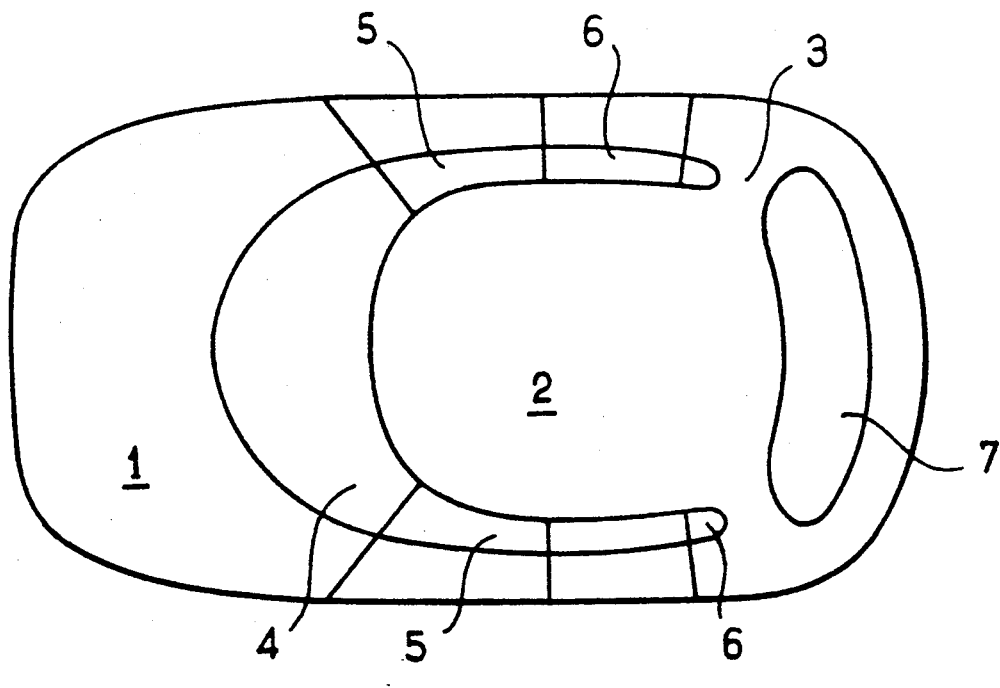
FIG_1
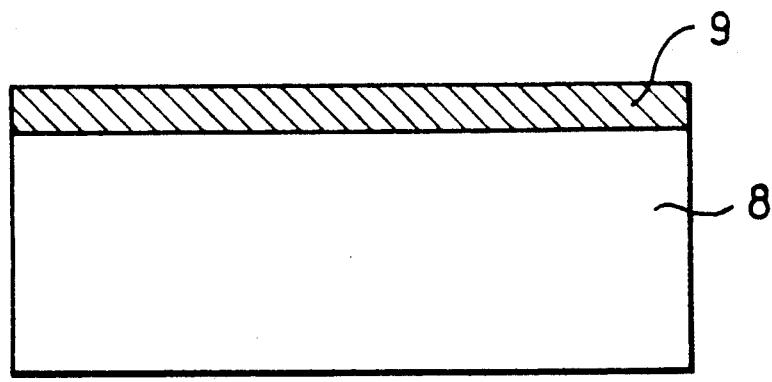
FIG_2

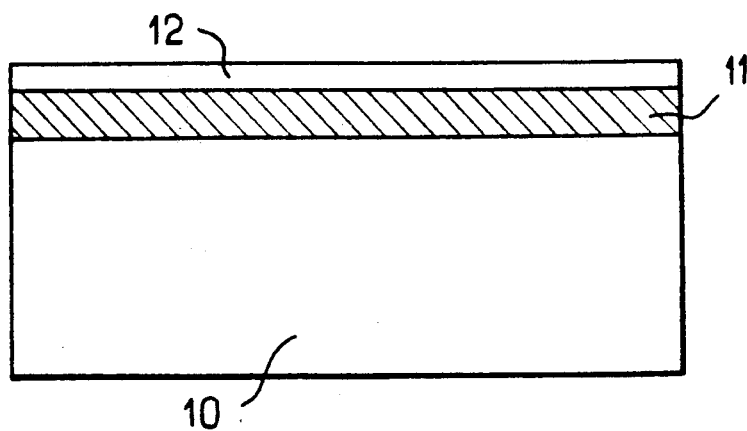
FIG_3
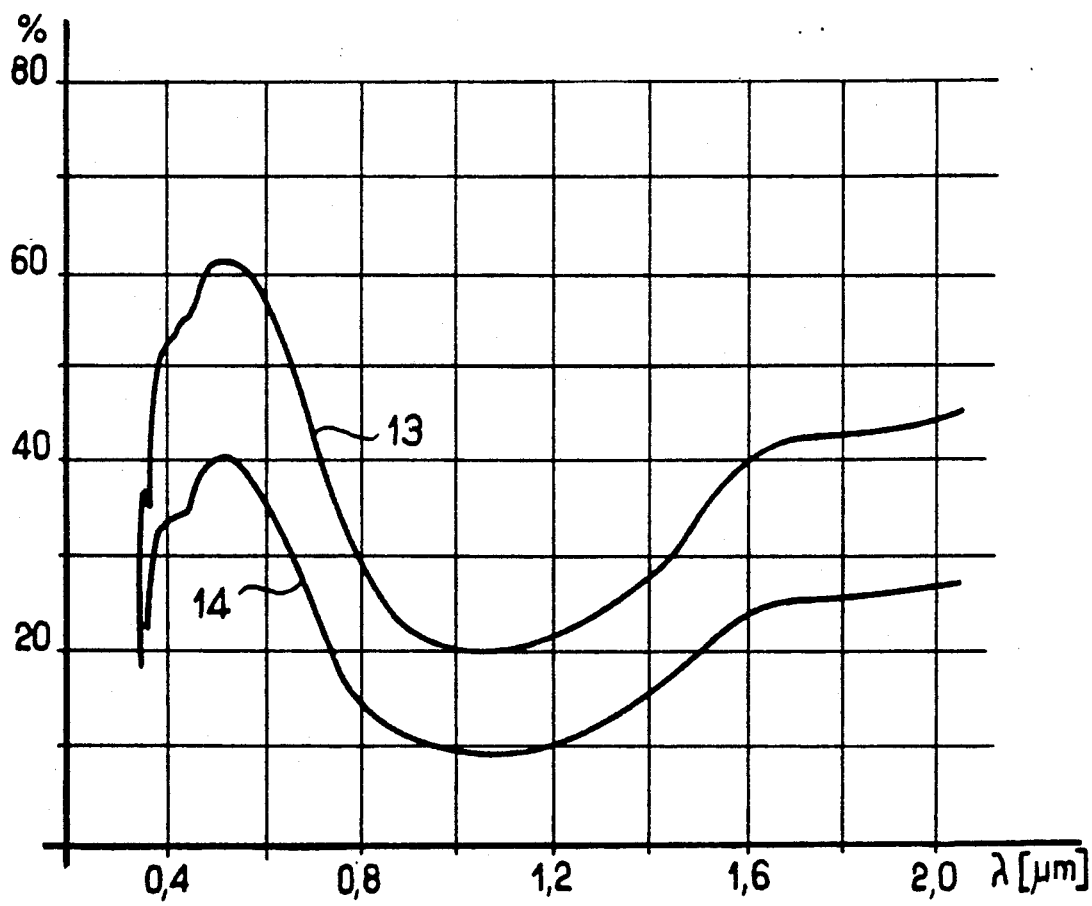
FIG_4

MONOLITHIC SOLAR PROTECTION GLAZING AND PROCESS OF ITS MANUFACTURE

BACKGROUND OF THE INVENTION

1. Field of the Invention

The invention relates to a glazing for solar protection, coated with a thin layer having a titanium carbide base. It is intended to equip automobiles.

2. Background of the Related Art

Many uses for glazings which reduce the transmission of solar radiation are known. Their purpose is limiting the energy entering rooms or vehicles to avoid an excessive heating and/or to limit the consumption of energy necessary for air conditioning.

Two techniques are known for reaching this goal, either the use of glasses tinted in mass by the addition of various metal oxides to the glass composition, or the deposit of thin absorbent or reflective layers on the surface of the glass sheets.

It is necessary to use a layer absorbent enough to absorb the solar radiation, and non-reflective enough to avoid discomfort and to remain in accordance with the relevant government regulations--particularly in the case of automobile glazings. Moreover, it is necessary that this layer to be resistant enough to chemical or mechanical attacks to be able to be used alone without being protected (as would be the case inside a laminated or multiple glazing).

For automobiles, there exists a demand for glazings of small thickness, but very heat absorbent. In modern automobiles, the glazed surface area has become very great and, further, windshields and rear windows are more and more inclined. This can produce a superheating of passenger spaces when they are exposed to the sun and increased passenger discomfort. That is why, to improve passenger comfort without reducing the visibility necessary for the driver, it has been considered to provide the different glazings of a vehicle with glasses having different heat transmission characteristics. For example, the windshield is the most transparent, the front side glazings are less transparent, yet less transparent the rear side glazings, and finally the rear window are the least transparent. Thus the requirement for maximum visibility through the windshield is met with light transmission greater than 75% according to the regulations but the other glazings for which the transmission requirement is less restrictive have greater heat absorption ability. Further, for reasons of weight, it is desired to use glasses whose thickness is the smallest possible. There is therefore a need in the case of glass tinted in mass, for a very dense coloring and for different degrees of coloring (four in the example chosen above). These two requirements are very difficult to meet in practice. A glass tinted for strong absorption of solar radiation is, as a corollary, derived from a glass mass itself very absorbent for the radiation of flames intended to heat the mass in the glass melting furnace. This characteristic very appreciably modifies the properties of the molten glass and particularly the convection currents in the molten glass, which is decisive in the production of a glass of good quality. That is why the density of the coloring of the glass generally is limited to fairly small values.

On the other hand, multiple intrinsic absorption coefficients, and therefore multiple colors of glass obtained thanks to additions of coloring agents in the melting furnace, which would be necessary to make the absorption characteristics vary without variations in thickness, would be applicable industrially only if the amounts of coloring agents consumed justified it: that is not generally the case. The traditional method which consists of changing the optical characteristics by acting on the glass thickness is not desirable because, for reasons of weight, it is desired to have a thickness of glass—generally tempered, except for the windshield—which is the thinnest possible, the limit being imposed for reasons of mechanical strength.

Further, the storage drawbacks that significant stocks cause should not be very different from what they are in the case of glasses of different compositions. The use of absorbent thin layers, optionally deposited on a glass that is absorbent, makes it possible to stock limited amounts of base glass, the various tints being applied on the product only in a final phase of production.

The techniques for depositing thin layers under vacuum using the cathode sputtering are well known. In particular, those which are performed in the presence of a magnetic field which multiplies the impacts of the ions on the target and accelerates the deposit are known. For example, German patent publication DE 24 63 431 C2 discloses such a process using a plane target and U.S. Pat. No. 4 116 806 uses a target in the form of a belt.

Likewise, techniques of reactive cathode sputtering are known which make it possible to obtain a thin layer by making the material of the target react with the gases of the plasma. U.S. Pat. No. 3 907 660 presents such a method for the deposit of metal oxide on glass.

Of the absorbent thin layers able to be used bare, i.e. without protection, on a glazing, nitrides, carbides or silicides of the metals of Groups IV, V, or VI of the periodic table are known. French patent publication FR 2 104 813 presents examples of nitrides of chromium, of molybdenum, chromium carbides, mixed carbides of chromium and titanium and various silicides. These layers are deposited by various methods such as cathode sputtering at radio frequency from targets consisting of the same material or, in the case of nitrides, reactive cathode sputtering from a target made of the metal concerned.

These layers act on the solar radiation both by absorption and by reflection, but their utility as layers intended for an automobile glazings resides in their relatively small reflection. However, to be used in an automobile it is necessary that the resistance to scratches of these layers be great, because any scratch will be visible both in reflected light, for example when an automobile is observed from the outside, and in transmitted light when from inside the automobile the countryside is observed through a side window, for example. Actually, if a very absorbent layer suffers a scratch, at the side of the scratch, its transmission is greatly increased, possibly reaching locally that of the glass without layer, which creates an intolerable appearance defect. This requires a layer particularly resistant to abrasion.

SUMMARY OF THE INVENTION

Applicants therefore sought to use a layer very resistant to abrasion and considered choosing a layer consisting of a material selected from those which are known for having, as a whole, a very good resistance to abrasion. Applicants then studied processes for making this layer and sought to improve its resistance to abrasion.

This invention has as an object a glazing equipped with such an improved layer as well as a process for preparation and application of such a glazing to a particular system of automobile glazings.

The glazing for solar protection of the invention is coated with a thin layer having a titanium carbide base covered with an overlayer of indium-tin oxide.

In a variant of the invention, the support glass of the layer is a glass tinted in mass. This support glass also can be tempered.

In another variant, the glazing according to the invention has a layer of indium-tin oxide whose thickness is less than 50 nm, but preferably on the order of the 15 nm.

Likewise, the layer of titanium carbide has a thickness between 8 and 50 nm and preferably about 15 nm or, in another variant, on the order of 35 nm.

The invention also relates to a process for preparing a layer of titanium carbide covered with a layer of indium-tin oxide, where the layer of titanium carbide is obtained by reactive carbide sputtering with a target of titanium in the presence of an atmosphere containing a hydrocarbide.

The cathode sputtering is preferably of the type reinforced by magnetic field and the hydrocarbide is advantageously methane. It is diluted in argon in a proportion between 8 and 20%, and preferably 14%.

In the process according to the invention, the power applied to the cathode during the deposit of titanium carbide is between 1 and 2 W/cm$^2$.

The invention also provides that the deposit of the layer of indium-tin oxide is performed immediately after the deposit of titanium carbide, without returning the glazing to the atmosphere.

It is also within the scope of the invention to apply the above glazings to a glazing system for a vehicle in which the transmission decreases by stages from one glazing to another, from the front to the rear of the vehicle; the variation of transmission is obtained here by layers of titanium carbide of greater or less thickness or by variation of the thickness of the glass.

According to the invention, a layer is available which makes it possible to adapt the transmission of the glazings to the needs of the automobile industry without appreciably modifying the appearance of the glazing obtained. Actually, as the layer according to the invention is placed most often on the face intended to be the inner face of the automobile glazing and this layer is of slightly bluish color in reflection, it only slightly modifies the appearance of the glazing in reflection and thus makes it possible to solve the problem of automobile glazings with transmission decreasing by degrees, but lacking a homogeneity of appearance.

The very great hardness obtained thanks to the invention makes it possible to use without fear the glazing coated with the TiC-ITO layer in monolithic glazing and therefore, under particularly good economic conditions.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 1 is a schematic plan view of an automobile equipped with glazings whose transmission varies by degrees from the front to the rear of the vehicle;

FIG. 2 shows a glass coated with a layer of titanium carbide;

FIG. 3 shows a glazing according to the invention where the layer of titanium carbide is covered with a layer of indium-tin oxide; and FIG. 4 shows the curves of transmission of two glazings according to the invention.

DESCRIPTION OF THE PREFERRED EMBODIMENTS

Motor vehicle 1 shown in FIG. 1 has a passenger space with a roof 2, opaque parts 3 and transparent parts 4, 5, 6 and 7.

The object of the invention is to make it possible easily to equip and automobile with glazings whose energy transmission $T_E$ for solar radiation decreases by degrees from windshield 4 to front side windows 5, mobile or stationary sides 6 and rear window 7.

The energy transmission is expressed by the formula:

$$T_E = \frac{\int_{0.2}^{2.5} S\lambda\, T\lambda\, d\lambda}{\int_{0.2}^{2.5} S\lambda\, d\lambda}$$

where $\lambda$ is the wavelength of the radiation expressed in $\mu$m, $S\lambda$ is the characteristic of the solar radiation at ground level and $T\lambda$ the spectral light transmission of the glazing measured under normal incident.

For reasons of comfort, it obviously is desired that the energy transmission through the glazings of an automobile be the smallest possible. Thus, the amount of energy which enters inside a vehicle in summer is limited, which also limits heating. It thus has been proposed that windshield 4 have an energy transmission limited to 0.60, front sides 5 to 0.50, rear sides 6 to 0.45, and rear window 7 to 0.30. These proposed limits take into account the requirements of light transmission $T_L$ which are imposed by the government standards which relate to the design and the driving of motor vehicles. $T_L$ is conventionally expressed by a formula similar to that of the energy transmission, but which takes into account a tungsten filament lamp as a light source and the human eye suited to daytime vision as a detector. It is necessary to take into account $T_L$ because most of the solar energy is in the visible part of the spectrum, and it is impossible to reduce appreciably the overall energy transmission without acting on the visible light. These energy transmissions mentioned above—which are only examples—constitute a compromise between an acceptable visibility and the best comfort possible.

In FIG. 2, a standard float glass 8 with a conventional soda-lime-silica composition has been shown, its thickness being 3.0 mm. On this glass, a very absorbent layer of titanium carbide 9 has been deposited. The deposit technique, which will be described later, is reactive cathode sputtering. Such a sample serves as reference, in particular for abrasion tests.

Abrasion tests are performed with grinding wheels made of abrasive powder held in an elastomer. The machine is produced by the company Taber Instrument Corporation in the United States. It is model 174 "Standard Abrasion Tester." The grinding wheels are the CS10F loaded with 500 grams. Each sample is subjected to 1,000 rotations. Its overall light transmission $\tau$ is measured with an integrating sphere before ($\tau_o$) and after ($\tau_{1000}$) abrasion. A third value ($\tau_v$) serves as a reference: the transmission of the glass without a layer. Wear by abrasion is measured by quantity U:

$$U = \frac{\tau_{1000} - \tau_o}{\tau_v - \tau_o}$$

FIG. 3 shows a glass according to the invention, i.e. support glass 10, which is generally tinted, is covered with a very absorbent layer 11, of titanium carbide identical to the layer of FIG. 2, but an overlayer 12 consisting of indium-tin oxide has been deposited by one of the methods of cathode sputtering which will be described later. Unlike the clear window of FIG. 2, the support of the layers according to the invention is preferably a float glass whose composition is that of a glass with a conventional soda-lime-silica glazing but which has been tinted green with iron and cobalt. The total amount of iron, reduced to $Fe_2O_3$ is, for example, 0.80% by weight and the proportion of ferrous ions relative to the total iron is 0.25. The amount by weight of cobalt (CoO) is then 4 ppm. The thickness of the glass is 3.15 mm.

In FIG. 4, two embodiments according to the invention are exhibited. Transmission curve 13 is that of a glazing which could be suitable as a rear side glazing. Its mode of preparation is described in Example 4 below. Likewise, curve 14 corresponds to the glazing of Example 6; it could advantageously constitute the rear window of a motor vehicle.

In the following examples, a certain number of embodiments are exhibited which will show how to use the invention and which will make it possible to evaluate its advantages.

EXAMPLE 1

The starting material was a clear float glass of 3.0 mm thickness. A sample of dimensions 10×10 cm was cut. It was washed and dried. It was put into the cathode sputtering installation of the laboratory. The latter was equipped with a cathode equipped with magnets. The target consisted of metal titanium. The dimensions of the latter was 9×21 cm. The cathode was stationary and the sample, carried by a carrousel of a diameter of 35 cm, passed before the target. The minimum distance between the sample and the target was 10 cm. Management of gas made it possible to make various gases with defined flows circulate in the enclosure.

In a conventional way, a discharge was initiated to rid the sample of organic residues which could exist, then a reactive deposit of TiC was performed. After having created a vacuum of $8 \cdot 10^{-3}$ torr, argon with a delivery rate of 17.2 cm3/mn (normal conditions of temperature and pressure - NCTP) was introduced, then methane ($CH_4$) with a delivery rate of 2.8 cm³/mn NCTP was introduced. When the pressure was stabilized in the enclosure, the carrousel was turned and a voltage of 360 volts applied to the target. Under the conditions of the experiment, the power was established at 290 watts or 1.5 watt/cm² of the target. The deposit then was left to proceed for 45 seconds.

After having taken the sample from the enclosure, it was measured and it was found that its transmission $T_L$ was 0.51, the thickness of the layer being 19 nm. This sample then was subjected to an abrasion test. After 1,000 turns, transmission $\tau_{1000}$ had increased to 0.66. The value of U was calculated by:

$$U = \frac{\tau_{1000} - \tau_o}{\tau_v - \tau_o}$$

as $\tau_v$ was 0.91, U=0.38.

EXAMPLE 2

The test was conducted here on the same installation as for Example 1. The first phase was the same, but the installation was equipped with a second cathode identical to the first, but provided with a sintered target of ceramic ITO whose In/Sn ratio by weight was 90/10. Immediately after the deposit of TiC under the same conditions and therefore with the same thickness as in Example 1, the Ar-$CH_4$ mixture was evacuated. Then an argon-oxygen mixture was put in with a ratio of delivery of 17/3. After stabilization, the cathode was brought to a voltage of 290 volts. The deposit was initiated until an ITO layer of 20 nm thickness was obtained.

After the sample was taken from the enclosure, an abrasion test was initiated. But this time, it was surprisingly found that the resistance of the layer to abrasion was very clearly improved: "wear" U was actually here 0.11, which was very surprising. Titanium carbide is known for its good resistance to wear and it is used to improve the performance of steel tools. It was therefore surprising that by covering a layer of titanium carbide with a layer of ITO, the abrasion performances are clearly improved (0.11 instead of 0.38).

EXAMPLE 3

The base glass and the experimental conditions were the same as in Example 2, but this time the period of the deposit of ITO was increased to provide a thickness of 32 nm. After the abrasion test, it was found that the sample which had before abrasion a transmission $\tau_o$ which was 0.55 had, after 1,000 turns of abrasion, a transmission $\tau_{1000}$ of 0.57. A "wear" U=0.06 was thus calculated which again was practically reduced by half relative to the preceding example.

The three examples above show the surprising effectiveness of ITO in thin layers to improve the resistance to abrasion of a product which, as a whole, is already well-known for its good resistance to scratching, i.e., titanium carbide.

The following examples will make it possible to see how the layers according to the invention with improved resistance to abrasion can be used alone, without protection, on the inner face of an automobile glazing and how they provide a solution to the problem of summer comfort in an automobile when they are deposited on tinted glasses.

EXAMPLE 4

For the deposit, a cathode sputtering installation similar to that of Example 2 was used. The only difference was the construction of the second cathode which comprised here a target of metal indium-tin alloy in a ratio by weight of 90-10.

The substrate was a tinted float glass of the type described above and shown in of FIG. 3. Its thickness was 3.15 mm and it underwent a heat tempering under normal conditions.

The first layer (TiC) was deposited as in the preceding examples but its thickness was only 15 nm. The deposit of ITO was performed differently. The argon-oxygen mixture here comprised a proportion of oxygen brought to 25%, the pressure which was established was $8 \times 10^{-3}$ torr. By reactive cathode sputtering, a layer of ITO whose thickness was 15 nm was deposited. It should be noted that for these types of deposits, which play no role in the infrared, the stoichiometric conditions of the deposit are not very critical. The appearance of the layer or its resistance to abrasion are very widely independent of the latter. The finished sample had a $T_L$ of 0.58, its glass side reflection, such as will be seen from outside the vehicle, was $R'_L = 0.09$ and its energy transmission $T_E = 0.41$.

Such a glazing therefore would be very suitable as a rear side glazing.

EXAMPLE 5

This Example was in all respects identical with Example 4 with the exception of the thickness of the ITO layer was increased to 25 nm. The results obtained were:

$T_L = 0.57$
$T'_L = 0.12$
$T_E = 0.40$

This example shows the impact of the ITO thickness on the reflection. It was previously seen that the thicker the ITO was, the better the resistance to abrasion. But it is seen here that the reflection increases and could even become irritating.

EXAMPLE 6

Here, the cathode sputtering installation was equipped as in Example 2. The glass, of the same composition as in Example 4, had a thickness of 4.00 mm. It was tempered.

The TiC layer that was deposited here was thick, on the order of 35 nm, and more precisely 32 nm. It intended to greatly lower the energy transmission. The ITO was deposited from a target of sintered ITO. The thickness obtained was 15 nm.

Thus, a light transmission of 0.40, a glass side light reflection of 0.11 and a very slight energy transmission of 0.26 were obtained.

Such a combination is well suited to the manufacturing of a rear window on a cathode sputtering installation intended to deposit layers on bent glazings.

In summary, the following table exhibits the energy characteristics of the glazings equipping the passenger space of an automobile and using for two of them the solutions of the glazings proposed by the invention.

The conventional laminated windshield is made with the same tinted glass as that whose composition is mentioned above. Its overall thickness is 5.4 mm; the outer tinted glass of 2.1 mm is associated with a clear float glass of 2.6 mm.

The front side glazing is made of the same green glass but with a thickness of 4 mm. The rear side glazing is that of Example 4, and for the rear window the glazing of Example 6.

|  | $T_L$ | $R_L'$ | $T_E$ |
|---|---|---|---|
| Windshield | 0.80 | 0.80 | 0.60 |
| Front Sides | 0.72 | 0.07 | 0.46 |
| Rear Sides | 0.58 | 0.09 | 0.41 |
| Rear Window | 0.40 | 0.11 | 0.26 |

What is claimed as new and desired to be secured by Letters Patent of the United States is:

1. Glazing for solar protection comprising:
   a) a support glass sheet;
   b) a thin layer of titanium carbide coated on the glass sheet; and
   c) a layer of indium-tin oxide having a thickness of less than 50 nm coated on the titanium carbide, whereby abrasion resistance of the glazing is increased.

2. Glazing according to claim 1, wherein the support glass sheet is a glass sheet tinted in mass.

3. Glazing according to claim 1, wherein the support glass sheet is a tempered glass sheet.

4. Glazing according to claim 1, wherein the thickness of the indium-tin oxide layer is about 15 nm.

5. Glazing according to claim 1, wherein the thickness of the layer of titanium carbide is about 15 nm.

6. Glazing according to claim 1, wherein the thickness of the layer of titanium carbide is about 35 nm.

7. Glazing according to claim 1, in a glazing system for a vehicle in which the light transmission of the glazings of the vehicle decreases by stages from one glazing to another, from the front to the rear of the vehicle.

* * * * *